(12) United States Patent  
Taguchi (10) Patent No.: US 11,660,825 B2  
(45) Date of Patent: May 30, 2023

(54) MANUFACTURING DEVICE OF PACKAGE AND MANUFACTURING METHOD OF PACKAGE

(71) Applicant: CKD CORPORATION, Aichi (JP)

(72) Inventor: Yukihiro Taguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 17/169,880

(22) Filed: Feb. 8, 2021

(65) Prior Publication Data

US 2021/0154946 A1    May 27, 2021

Related U.S. Application Data

(63) Continuation of application No. PCT/JP2019/029698, filed on Jul. 29, 2019.

(30) Foreign Application Priority Data

Sep. 27, 2018   (JP) .............................. JP2018-181603

(51) Int. Cl.
    *G01B 11/06*    (2006.01)
    *B29C 65/82*    (2006.01)
    (Continued)

(52) U.S. Cl.
    CPC .......... *B29C 65/8253* (2013.01); *B65B 51/10* (2013.01); *B65B 57/02* (2013.01);
    (Continued)

(58) Field of Classification Search
    CPC .... G01B 11/06; G01B 11/0691; G01B 15/02; G01B 15/025; G01N 21/9054;
    (Continued)

(56) References Cited

U.S. PATENT DOCUMENTS

| | | | | |
|---|---|---|---|---|
| 5,184,190 A | * | 2/1993 | Rai ..................... | G01N 21/8901 250/559.12 |
| 5,890,347 A | * | 4/1999 | Giacomelli ......... | B29C 66/1122 53/DIG. 2 |

(Continued)

FOREIGN PATENT DOCUMENTS

| | | | | |
|---|---|---|---|---|
| FR | 3055409 | * | 3/2018 | ............. G01B 11/06 |
| JP | S62-276444 A | | 12/1987 | |

(Continued)

OTHER PUBLICATIONS

Machine translation of FR3055409 (Year: 2018).*

(Continued)

*Primary Examiner* — Scott W Dodds (74) *Attorney, Agent, or Firm* — Osha Bergman Watanabe & Burton LLP (57) ABSTRACT

A manufacturing device is used for manufacturing a package including a resin sheet and a predetermined work wrapped with the resin sheet. The manufacturing device includes: a sealing unit that thermally welds overlapping parts of the sheet; and an inspection device that inspects a sealing quality of the sealed portion thermally welded by the sealing unit. The sealing unit makes, by the thermal welding, a thickness of the sealed portion after the thermal welding smaller than a total thickness of the overlapping parts prior to the thermal welding. The inspection device obtains thickness information on the thickness of the sealed portion and determines the sealing quality of the sealed portion based on the thickness information.

5 Claims, 5 Drawing Sheets

(51) Int. Cl.
 B65B 51/10 (2006.01)
 B65B 57/02 (2006.01)
 G01N 21/90 (2006.01)
 B29C 65/02 (2006.01)
(52) U.S. Cl.
 CPC .......... G01B 11/06 (2013.01); G01N 21/9054 (2013.01); *B29C 65/02* (2013.01)
(58) Field of Classification Search
 CPC .......... B29C 65/8253; B29C 66/43121; B29C 66/43122; B29C 66/43123; B65B 51/10
 See application file for complete search history.

(56) References Cited

U.S. PATENT DOCUMENTS

| | | | | |
|---|---|---|---|---|
| 6,720,989 | B2* | 4/2004 | Martel | G06V 10/457 |
| | | | | 348/125 |
| 9,354,211 | B2* | 5/2016 | Hepp | G01N 29/04 |
| 2003/0213543 | A1* | 11/2003 | Perrine | B29C 65/08 |
| | | | | 383/107 |
| 2017/0152064 | A1* | 6/2017 | Aurand | B29C 66/346 |
| 2019/0381741 | A1* | 12/2019 | Savitski | B29C 66/114 |

FOREIGN PATENT DOCUMENTS

| | | |
|---|---|---|
| JP | S62-277512 A | 12/1987 |
| JP | H02-297007 A | 12/1990 |
| JP | H06-345062 A | 12/1994 |
| JP | 2002-236004 A | 8/2002 |
| KR | 20-2010-0006386 U | 6/2010 |
| WO | 2016/088713 A1 | 6/2016 |

OTHER PUBLICATIONS

International Preliminary Report on Patentability for PCT/JP2019/029698, dated Mar. 23, 2021 (14 pages).
International Search Report issued in corresponding International Application No. PCT/JP2019/029698 dated Oct. 8, 2019 (5 pages).
Notice of Reasons for Refusal issued in corresponding Japanese Application No. 2018-181603 dated Jan. 7, 2020 (8 pages).

* cited by examiner

MANUFACTURING DEVICE OF PACKAGE AND MANUFACTURING METHOD OF PACKAGE

BACKGROUND

Technical Field

The present disclosure relates to a manufacturing device and a manufacturing method of obtaining a package by packing a predetermined work with a predetermined sheet.

Description of Related Art

A package with a predetermined work (for example, commodity, a food article, a machine component or the like) placed and packed in a sheet made of, for example, a resin such as polyethylene may be obtained by packing the work with the sheet and thermally welding the sheet. The package may be manufactured by a packaging device (a manufacturing device of a package) equipped with, for example, a sealing unit configured to thermally weld the sheet.

A sealed portion formed by thermal welding is likely to have a sealing failure, for example, insufficient welding of the sheets. A conventionally known configuration of an inspection device used to perform an inspection for such a sealing failure includes a laser light source configured to irradiate a sealed portion with laser beam, a light detector configured to detect the quantity of light transmitted through the sealed portion, and a light shielding plate placed between the sealed portion and the light detector and provided with a hole formed to allow for passage of the laser beam (as described in, for example, Patent Literature 1).

The inspection device described in Patent Literature 1 determines the good/poor quality of sealing with regard to the sealed portion, based on the quantity of light detected by the light detector. More specifically, in the case of good sealing quality, a plurality of sheets forming the sealed portion are in close contact with each other and tightly adhere to each other, so that the emitted laser beam almost directly passes through the sealed portion. Accordingly, a relatively large quantity of light passing through the hole of the light shielding plate and entering the light detector indicates the good sealing quality. In the case of poor sealing quality, on the other hand, there is a clearance between a plurality of sheets forming the sealed portion, so that the emitted laser beam is reflected, refracted, and scattered when the light enters the sheet or goes out of the sheet. As a result, the light transmitted through the sealed portion is scattered over a wide range. Accordingly, a relatively small quantity of light passing through the hole of the light shielding plate and entering the light detector indicates the poor sealing quality.

PATENT LITERATURE

Patent Literature 1: JP No. S62-276444A

In the inspection device described above, however, in the case where there is no sufficient space for refraction, scattering or the like formed between the sheets, a relatively large quantity of light enters the light detector. Accordingly, a relatively large quantity of light is detected, for example, when the sheets are brought into contact with each other but are not sufficiently welded to each other. The actually poor sealing quality is thus likely to be mistakenly determined as good sealing quality.

SUMMARY

By taking into account the circumstances described above, one or more embodiments of the present invention provide a manufacturing device of a package and a manufacturing method of a package that perform an inspection for the good/poor quality of sealing with the higher accuracy.

The following describes embodiments of the present invention. Functions and advantageous effects of embodiments of the present invention are also described as appropriate.

One or more embodiments of the present invention provide a manufacturing device of a package that is obtained by packing a predetermined work with a sheet made of a resin. The manufacturing device of the package comprises a sealing unit configured to thermally weld overlapping parts of the sheet; and an inspection unit configured to perform an inspection for good/poor quality of sealing with regard to a sealed portion of the sheet formed by thermal welding by the sealing unit. The sealing unit is configured to perform the thermal welding such as to make a thickness of the sealed portion smaller than a total thickness of the overlapping parts of the sheet as an object to be thermally welded prior to the thermal welding. The inspection unit comprises a thickness information obtaining unit configured to obtain thickness information corresponding to the thickness of the sealed portion; and a good/poor quality judgment unit configured to determine good/poor quality of sealing with regard to the sealed portion, based on the thickness information obtained by the thickness information obtaining unit.

The "thickness information" may be a thickness itself or may be any of various information varying with a variation in thickness.

In the manufacturing device of one or more embodiments, the sealing unit performs thermal welding such as to make the thickness of the sealed portion smaller than the total thickness of the overlapping parts of the sheet corresponding to the sealed portion prior to thermal welding. Accordingly, the sealed portion that is appropriately welded to have a good sealing quality has a sufficiently smaller thickness than the total thickness. The sealed portion that is not sufficiently welded to have a poor sealing quality, on the other hand, has a thickness equivalent to or even larger than the total thickness (for example, in the case where there is a clearance between the overlapping parts of the sheet). As described above, the sealing unit performs thermal welding such as to correlate the good/poor quality of sealing to the thickness of the sealed portion.

Additionally, in the inspection unit, the thickness information obtaining unit obtains the thickness information corresponding to the thickness of the sealed portion, and the good/poor quality judgment unit determines the good/poor quality of sealing, based on the thickness information. For example, in the case where there is no clearance between the overlapping parts of the sheet that form the sealed portion and where the sheet is sufficiently welded, the sealed portion becomes relatively thin. The good/poor quality judgment unit accordingly determines the good quality of sealing. In another example, in the case where there is a clearance between the overlapping parts of the sheet that form the sealed portion or where the overlapping parts of the sheet are not sufficiently welded, on the other hand, the sealed portion becomes relatively thick. The good/poor quality judgment unit accordingly determines the poor quality of sealing. As described above, the good/poor quality of sealing is correlated to the thickness of the sealed portion. The configuration of performing the good/poor quality judgment based on the thickness information thus enables the good/poor quality of sealing to be determined with the higher accuracy.

The sealing unit may be configured to perform thermal welding such as to make the thickness of a sealed portion smaller than the total thickness of the overlapping parts of the sheet as an object to be thermally welded prior to the thermal welding and larger than a predetermined limit thickness. In this case, the good/poor quality judgment unit may be configured to determine the poor sealing quality when the sealed portion is excessively thin. This configuration allows for detection of a sealing failure or the like due to, for example, a damage of the sealed portion and thereby further enhances the accuracy of inspection.

In the manufacturing device of the package of one or more embodiments, the thickness information obtaining unit may comprise an irradiation unit configured to irradiate the sheet with ultraviolet light; and an imaging unit configured to take an image of ultraviolet light transmitted through the sheet in a state that the sheet including the sealed portion is irradiated with the ultraviolet light by the irradiation unit. The thickness information obtaining unit may be configured to obtain information with regard to a quantity of transmitted light of the sealed portion, based on image data obtained by the imaging unit, as the thickness information. The good/poor quality judgment unit may determine good/poor quality of sealing with regard to the sealed portion, based on the information with regard to the quantity of transmitted light.

The configuration of one or more embodiments obtains the information with regard to the quantity of transmitted light with regard to the sealed portion, based on the image data obtained by the imaging unit (for example, a luminance value or the like of the sealed portion in the image data). When the sheet is irradiated with ultraviolet light, a logarithmic value of an ultraviolet light transmittance is generally proportional to the thickness of the sheet, and the ultraviolet light transmittance is inversely proportional to some power of the thickness of the sheet. Accordingly, the magnitude relation of the light quantity of ultraviolet light transmitted through the sheet (quantity of transmitted light) depends upon the thickness of the sheet. The configuration of obtaining the information with regard to the quantity of transmitted light as the thickness information accordingly enables the thickness of the sheet to be figured out more accurately. This enables the good/poor quality of sealing to be determined with the higher accuracy.

Furthermore, the configuration of using the image data enables the thickness of the entire area of the sealed portion to be figured out. This configuration accordingly enables a sealing failure occurring in only a narrow part of the sealed portion to be found out and further enhances the accuracy of inspection.

One or more embodiments of the present invention provide a manufacturing method of a package that is obtained by packing a predetermined work with a sheet made of a resin. The manufacturing method of the package comprises a sealing process of thermally welding overlapping parts of the sheet; and an inspection process of performing an inspection for good/poor quality of sealing with regard to a sealed portion of the sheet formed by thermal welding in the sealing process. The sealing process performs the thermal welding such as to make a thickness of the sealed portion smaller than a total thickness of the overlapping parts of the sheet as an object to be thermally welded prior to the thermal welding. The inspection process comprises a thickness information obtaining process of obtaining thickness information corresponding to the thickness of the sealed portion; and a good/poor quality judgment process of determining good/poor quality of sealing with regard to the sealed portion, based on the thickness information obtained in the thickness information obtaining process.

The configuration of one or more embodiments has similar functions and advantageous effects to those of the embodiments described above.

In the manufacturing method of the package of one or more embodiments, the thickness information obtaining process may comprise performing an imaging process of taking an image of ultraviolet light transmitted through the sheet in a state that the sheet including the sealed portion is irradiated with ultraviolet light. The thickness information obtaining process may obtain information with regard to a quantity of transmitted light of the sealed portion, based on image data obtained in the imaging process, as the thickness information. The good/poor quality judgment process may determine good/poor quality of sealing with regard to the sealed portion, based on the information with regard to the quantity of transmitted light.

The configuration of one or more embodiments has similar functions and advantageous effects to those of the embodiments described above.

DETAILED DESCRIPTION

The following describes embodiments of the present invention with reference to drawings. A package 1 manufactured by a packaging device is described first.

Figure 1:
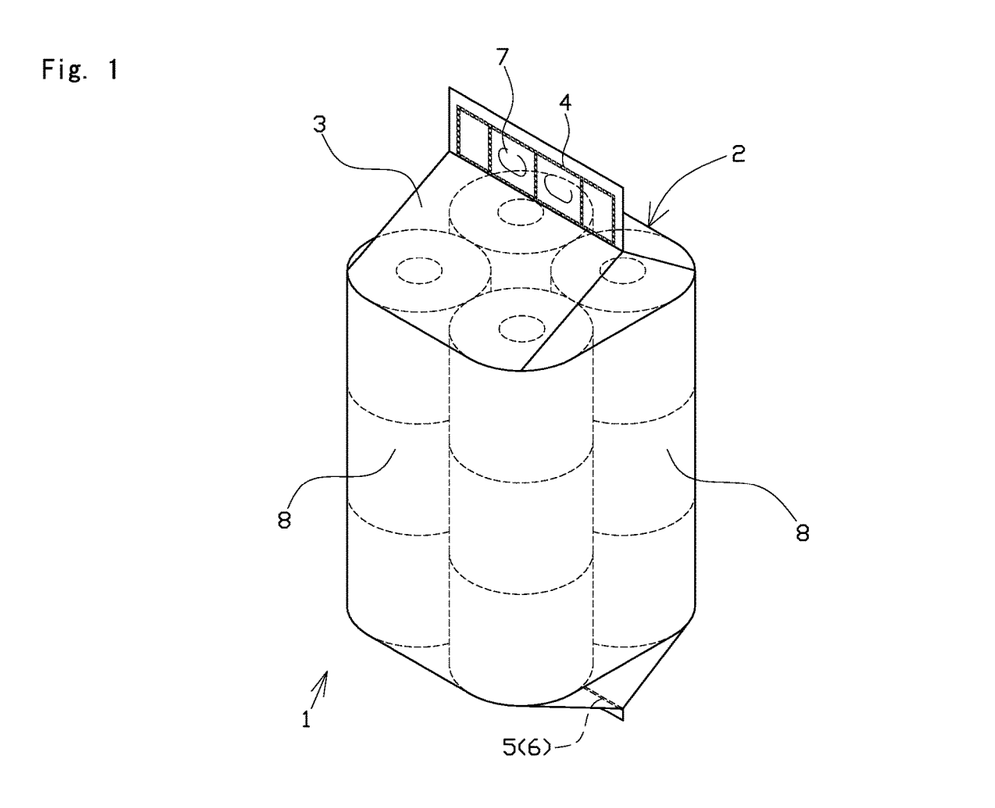
FIG. 1 is a perspective view illustrating a package.
Figure 2:
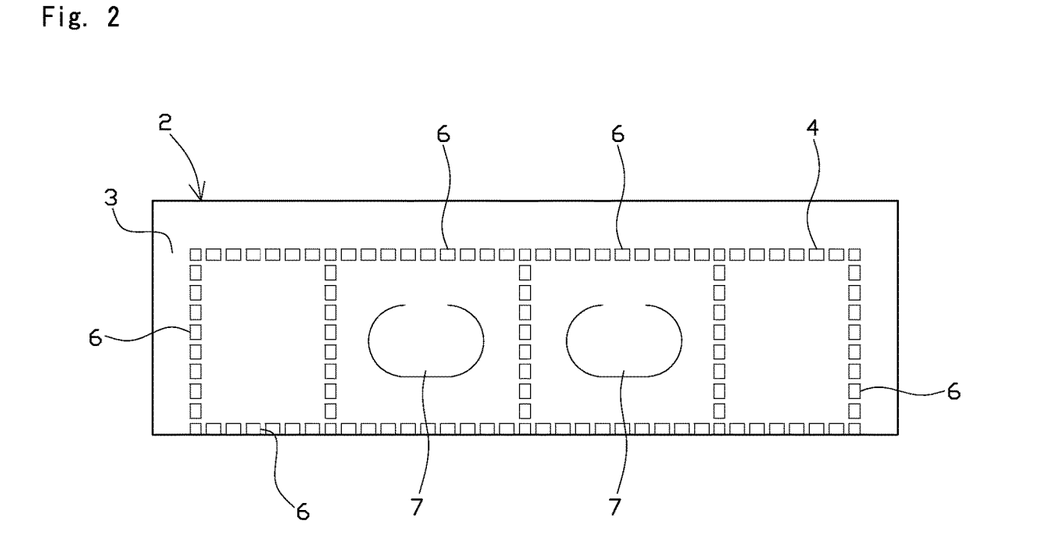
FIG. 2 is an enlarged view illustrating a sheet placed in an upper portion of the package.

As shown in FIG. 1 and FIG. 2, the package 1 includes a packing bag 2 to pack a plurality of works 8 (rolls of paper according to one or more embodiments. The packing bag 2 is formed by thermally welding respective ends of a sheet 3 in a cylindrical shape and has welded parts 4 and 5 in an upper portion and a lower portion thereof. The sheet 3 is made of a transparent or translucent thermoplastic resin (for example, polyethylene or the like).

The welded parts 4 and 5 have sealed portions 6. The sealed portion 6 is formed by stacking and thermally welding at least two sheet parts out of the respective parts of the sheet 3 forming a front face, a rear face and both side faces of the packing bag 2.

Moreover, in the welded part 4 placed in the upper portion of the packing bag 2, a plurality of the sealed portions 6 are provided to be respectively formed in a rectangular shape in front view and to be arranged in a regular pattern in a horizontal direction and in a vertical direction. According to one or more embodiments, the respective sealed portions 6 in the welded part 4 are arranged in two horizontal seal lines arrayed in a horizontal direction and five vertical seal lines arrayed in a vertical direction. The vertical seal lines are placed at intervals in the horizontal direction between the horizontal seal lines. The respective sealed portions 6 in the welded part 4 are arranged to be separate from each other. As a result, an upper end of the packing bag 2 is formed breathable.

Additionally, a pair of finger catchers 7 that are to be caught by fingers of a user are provided on a left side and a right side of the vertical seal line located in the middle in the upper portion of the packing bag 2. Each of the finger catchers 7 has a cut line in an approximately elliptical shape. When the user cuts the sheet 3 along the cut lines, through holes are formed in the upper portion of the packing bag 2. The user is allowed to insert the fingers into the through holes and carry the works 8.

In the welded part 5 placed in the lower portion of the packing bag 2, on the other hand, the sealed portion 6 is in a linear shape continuously extended along the horizontal direction.

Figure 3:
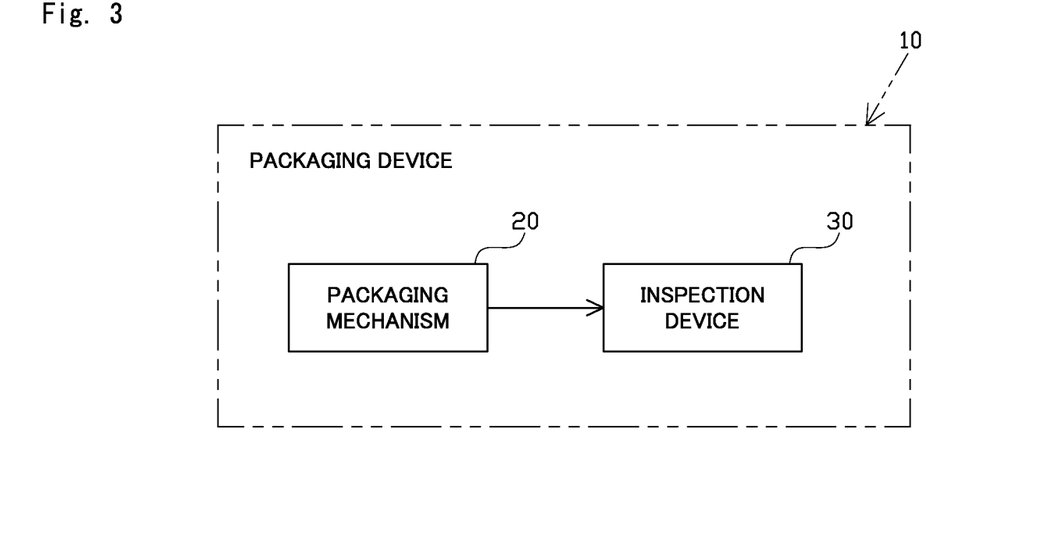
FIG. 3 is a block diagram illustrating the schematic configuration of a packaging device.

The following describes the schematic configuration of a packaging device 10 used to manufacture the package 1 described above. As shown in FIG. 3, the packaging device 10 includes a packaging mechanism 20 and an inspection device 30. According to one or more embodiments, the manufacturing device of the package is configured by the packaging device 10, and the inspection unit is configured by the inspection device 30.

Figure 4:
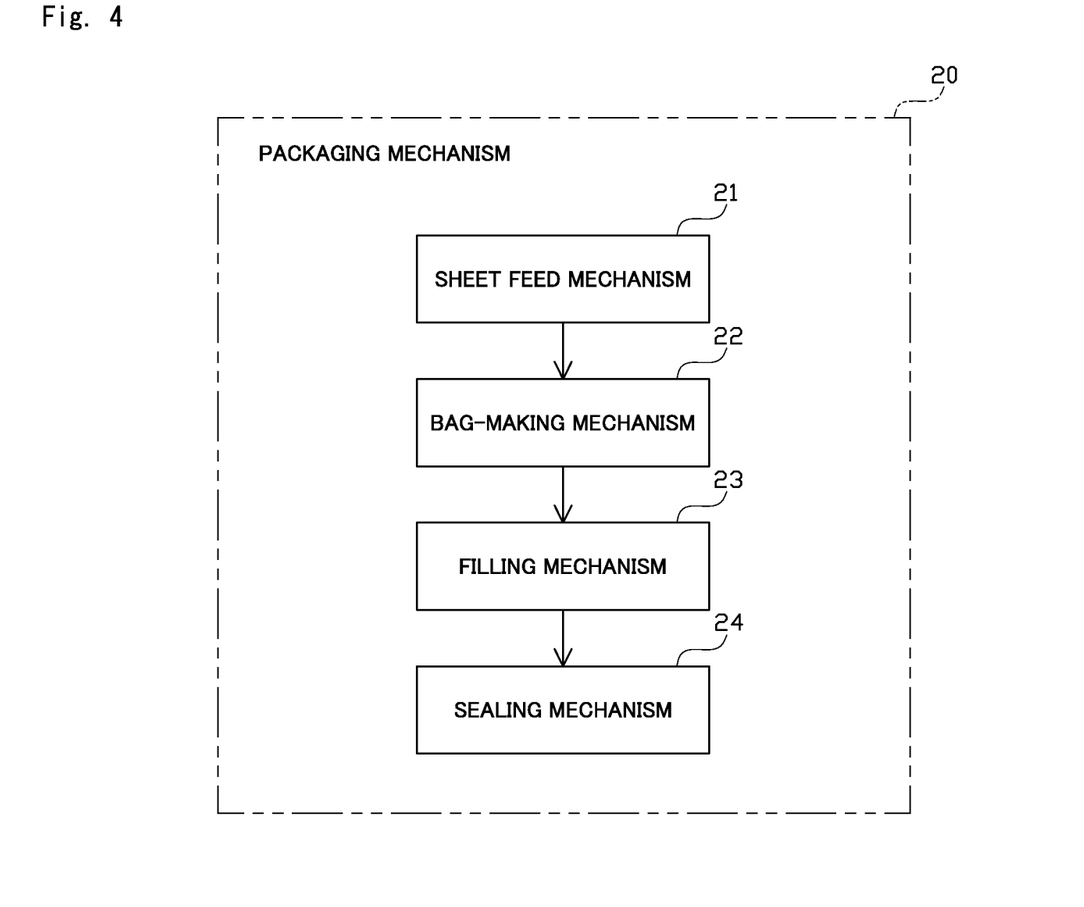
FIG. 4 is a block diagram illustrating the schematic configuration of a packaging mechanism.

As shown in FIG. 4, the packaging mechanism 20 includes a sheet feed mechanism 21, a bag-making mechanism 22, a filling mechanism 23 and a sealing mechanism 24. According to one or more embodiments, the bag-making mechanism 22 and the sealing mechanism 24 correspond to the sealing unit.

The sheet feed mechanism 21 rotatably supports a sheet roll of the wound sheet 3 that is formed in advance in the cylindrical shape. The sheet feed mechanism 21 inflates the sheet 3 in the cylindrical shape with compressed air or the like, folds two parts opposed to each other of the sheet 3 in the cylindrical shape 3 inward of the sheet 3, and places the sheet 3 between a pair of rollers (not shown) to feed out the sheet 3. This forms the sheet 3 in a belt-like shape having gussets on respective ends in a width direction thereof. The sheet 3 formed in the belt-like shape is fed to the bag-making mechanism 22.

The bag-making mechanism 22 thermally welds an end of the sheet 3 in the belt-like shape fed from the sheet feed mechanism 21 and cuts the sheet by a predetermined length. This forms the welded part 5 (sealed portions 6) placed in the lower portion of the packing bag 2, so as to form the sheet 3 in a bag shape. The predetermined length may be varied appropriately corresponding to the number of the works 8 and the size of the works 8 placed in the packing bag 2.

The filling mechanism 23 serves to array a predetermined number of the works 8 and fill the arrayed works 8 into the sheet 3 in the bag shape produced by the bag-making mechanism 22. The filling mechanism 23 is comprised of, for example, a stacking mechanism configured to stack the predetermined number of the works 8 in an inverted attitude, a bucket configured to hold the sheet in the bag shape in an open state, and a pusher configured to push the works 8 in the inverted attitude into the sheet 3 in the bag shape held in the open state by the bucket (none of the components are shown).

The sealing mechanism 24 gusset-folds the opening of the sheet 3 in the bag shape with the works 8 packed (filled with the works 8), lays the parts of the sheet 3 over each other, and clamps the overlapping parts of the sheet 3 by a predetermined sealer (not shown), so as to thermally weld the overlapping parts of the sheet 3. The sealing mechanism 24 forms the welded part 4 (the sealed portions 6) placed in the upper portion of the packing bag 2.

According to one or more embodiments, the operations of the bag-making mechanism 22 and the sealing mechanism 24 are set to thermally weld the overlapping parts of the sheet 3 such as to make the thickness of the formed sealed portions 6 smaller than the total thickness of the overlapping parts of the sheet 3, which are the object to be thermally welded, prior to thermal welding. Accordingly, the sealed portion 6 that is appropriately welded to have a good sealing quality has a sufficiently smaller thickness than the total thickness. The sealed portion 6 that is not sufficiently welded to have a poor sealing quality, on the other hand, has a thickness equivalent to or even larger than the total thickness (for example, in the case where there is a clearance between the overlapping parts of the sheet 3). As described above, the bag-making mechanism 22 and the sealing mechanism 24 perform thermal welding such as to correlate the good/poor quality of sealing to the thickness of the sealed portion 6.

After thermal welding by the sealing mechanism 24, the package 1 is obtained by cutting a non-required part of the sheet by a predetermined non-required part cutting device (not shown) and forming the finger catchers 7 by a predetermined cutting line forming device (not shown). A modified configuration may form the finger catchers 7 in the process of thermal welding by the sealing mechanism 24.

The following describes the inspection device 30. The inspection device 30 performs an inspection for the good/poor quality of sealing with regard to the sealed portions 6 of the sheet 3 thermally welded by the bag-making mechanism 22 and the sealing mechanism 24.

Figure 5:
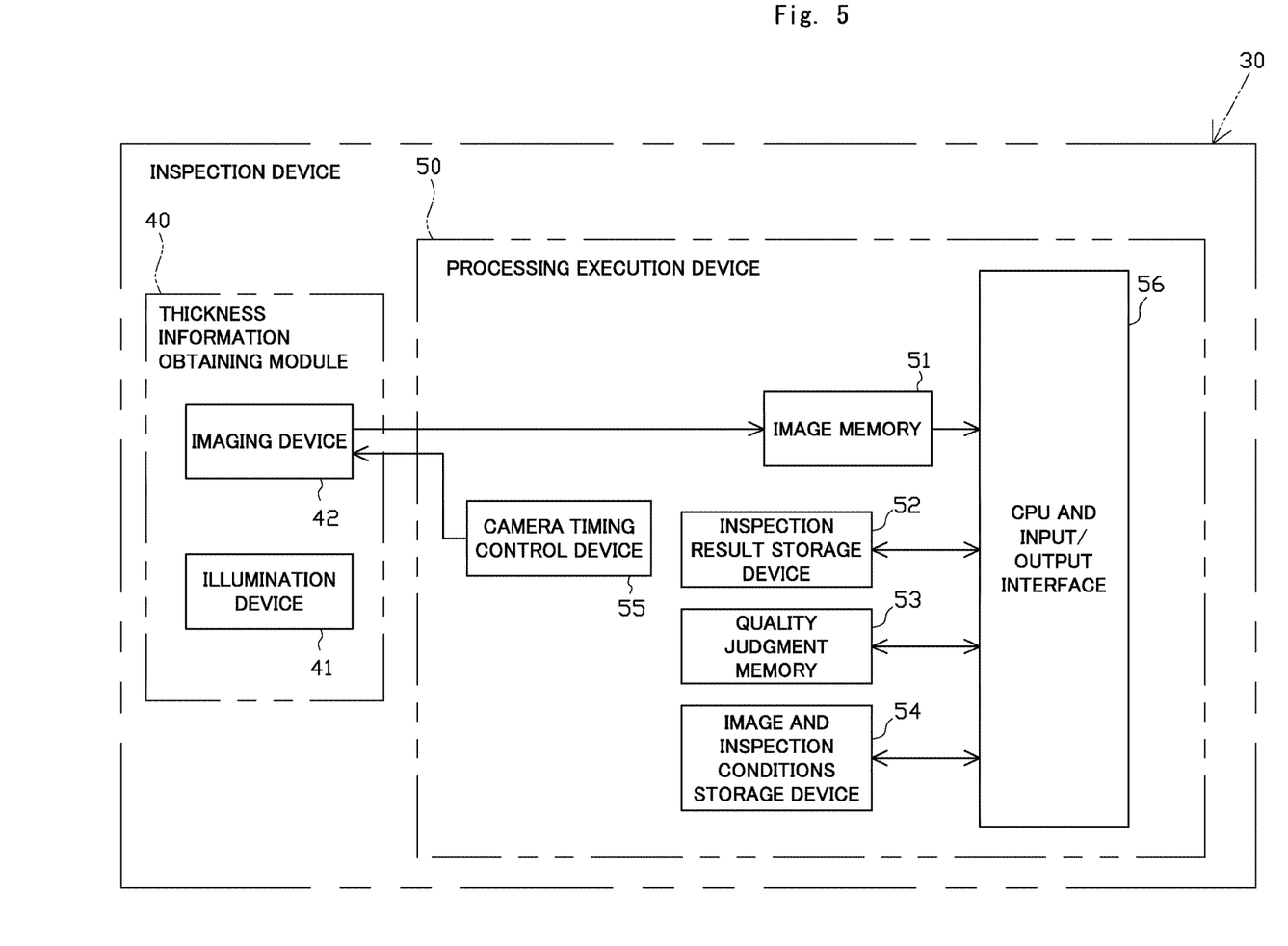
FIG. 5 is a block diagram illustrating the electrical configuration of an inspection device.
Figure 6:
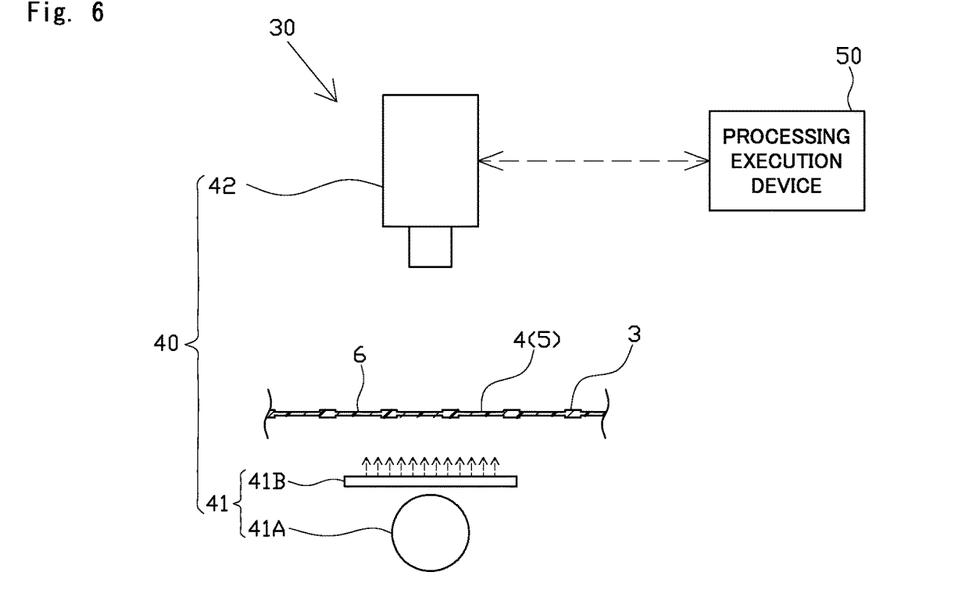
FIG. 6 is a schematic diagram illustrating the schematic configuration of the inspection device.

As shown in FIG. 5 and FIG. 6, the inspection device 30 includes a thickness information obtaining module 40 and a processing execution device 50. According to one or more embodiments, the thickness information obtaining module 40 corresponds to the thickness information obtaining unit, and the processing execution device 50 corresponds to the good/poor quality judgment unit.

The thickness information obtaining module 40 is configured to obtain thickness information regarding the thickness of the sealed portion 6 and includes an illumination device 41 and an imaging device 42. According to one or more embodiments, the illumination device 41 corresponds to the irradiation unit, and the imaging device 42 corresponds to the imaging unit.

The illumination device 41 is placed below the sheet 3 including the sealed portions 6 that are objects to be inspected and includes a light source 41A comprised of, for example, an LED to emit ultraviolet light (for example, light having wavelength of 200 to 380 nm) and a diffusion plate 41B placed between the light source 41A and the sheet 3 and comprised of, for example, ground glass. The illumination device 41 is configured to radiate the diffused ultraviolet light toward the sheet 3 including the sealed portions 6.

The imaging device 42 is provided on a side opposite to the illumination device 41 across the sheet 3. According to one or more embodiments, a CCD camera having sensitivity to at least ultraviolet light is employed as the imaging device 42. The imaging device 42 is, however, not limited to this example, but a CMOS camera may be employed.

The imaging device 42 is configured to take a two-dimensional image of the ultraviolet light transmitted through the sheet 3 when the sheet 3 including the sealed portions 6 is irradiated with the ultraviolet light emitted from the illumination device 41. Image data (luminance image data) obtained by imaging with the imaging device 42 is converted into a digital signal (image signal) inside of the imaging device 42 and is input in the form of digital signal into the processing execution device 50. The image data includes information with regard to the quantities of transmitted light of the sealed portions 6 (luminance values of the sealed portions 6 according to one or more embodiments) as the thickness information. An imaging range of the imaging device 42 is set to a range that covers at least the entire areas of the welded parts 4 and 5. According to one or more embodiments, the imaging device 42 is configured to respectively take images of the welded part 4 and the welded part 5 and obtain respective image data with regard to the welded part 4 and with regard to the welded part 5.

The processing execution device 50 is configured to determine the good/poor quality of the sealed portions 6, based on the image data obtained by the imaging device 42 (more specifically, the information with regard to the quantities of transmitted light of the sealed portions 6 as the thickness information obtained from the image data). The processing execution device 50 is configured as a so-called computer system that includes, for example, a central processing unit (CPU) serving as the arithmetic unit, a ROM serving to store various programs, and a RAM serving to temporarily store a variety of data such as arithmetic data and input and output data. The processing execution device 50 includes an image memory 51, an inspection result storage device 52, a quality judgment memory 53, an image and inspection conditions storage device 54, a camera timing control device 55, and a CPU and input/output interface 56.

The image memory 51 is configured to store image data obtained by the imaging device 42. An inspection is performed, based on the image data stored in this image memory 51. The image data may be processed before the inspection is performed. For example, the image data may be processed by a masking process or a shading correction. There is a technical limitation in uniformly irradiating an entire imaging range with the lights emitted from the illumination device 41. The shading correction is accordingly performed to correct a variation in luminosity of light caused by a difference in position. Binarized image data obtained by a binarizing process of the image data, masked image data obtained by a masking process of the image data and the like are also stored into the image memory 51.

The inspection result storage device 52 is configured to store, for example, good/poor quality judgment result data and statistical data obtained by probability statistical processing of the good/poor quality judgment result data.

The quality judgment memory 53 is configured to store various information used for the inspection. The various information includes quality judgment criteria (for example, a threshold value) used for good/poor quality judgment and data for defining an inspection object range (for example, information for specifying an area occupied by the sheet 3 in the image data). According to one or more embodiments, a luminance threshold value and an area reference value are stored as the quality judgment criteria. The luminance threshold value is used to perform a binarization process of image data, and the area reference value is used to perform good/poor quality of sealing judgment. According to one or more embodiments, appropriate numerical values calculated in advance are respectively stored as the luminance threshold value and the area reference value.

The image and inspection conditions storage device 54 is configured by, for example, a hard disk drive, to store, for example, the date and the time of each defective determination and the inspection conditions used for the inspection.

The camera timing control device 55 is configured to control an imaging timing of the imaging device 42. This imaging timing is controlled on the basis of a signal from a sensor (not shown) provided in the packaging device 10 to detect the package 1. Imaging by the imaging device 42 is performed every time the package 1 is set at a predetermined inspection position.

The CPU and input/output interface 56 is involved in various controls in the inspection device 30. The CPU and input/output interface 56 is configured to send and receive signals to and from the respective component devices of the packaging device 10. The CPU and input/output interface 56 also serves to send various data to a predetermined display unit (not shown) such as a display. This function enables various images and inspection results to be displayed on the display unit.

Furthermore, the processing execution device 50 performs the good/poor quality judgment with regard to the sealing quality by using the storage contents of the quality judgment memory 53 and the like based on the image data obtained by the imaging device 42. More specifically, the processing execution device 50 first sets an inspection object range of the obtained image data. For example, the processing execution device 50 processes the obtained image data by a predetermined masking process to set the area occupied by the sheet 3 in the image data, as the inspection object range. A remaining area after exclusion of an area occupied by the finger catchers 7 from the area occupied by the sheet 3 may be set as the inspection object range.

The processing execution device 50 subsequently processes the image data by a binarization data using the luminance threshold value stored in the quality judgment memory 53 to obtain binarized image data that expresses the luminance of each pixel by "0 (dark)" or "1 (bright)".

Figure 7:
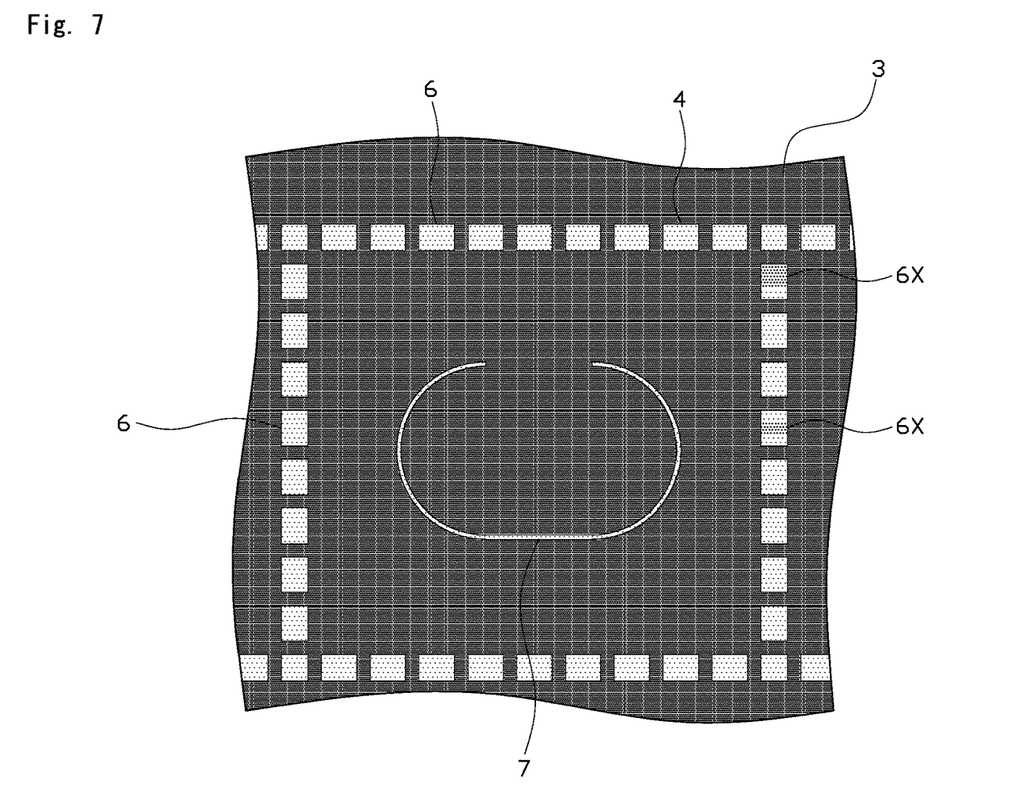
FIG. 7 is a schematic diagram illustrating one example of image data.

As described above, the bag-making mechanism 22 and the sealing mechanism 24 perform thermal welding such as to make the thickness of a sealed portion 6 smaller than the total thickness of the overlapping parts of the sheet 3 prior to thermal welding corresponding to the sealed portion 6. Accordingly, the thickness of a sealed portion 6 that is appropriately welded and has the good sealing quality is smaller than the total thickness described above. As shown in FIG. 7 (FIG. 7 illustrates the sealed portions 6 of the welded part 4 and the like), this sealed portion 6 has a relatively large quantity of transmitted light (luminance value) in the image data. The thickness of a sealed portion 6 that is not sufficiently welded and has the poor sealing quality (hereinafter referred to as "poor sealed portion 6X) is, on the other hand, equivalent to or even larger than the total thickness described above. Accordingly, the poor sealed portion 6X has a relatively small quantity of transmitted light (luminance value) in the image data (as shown in FIG. 7). As described above, the sealed portion 6 of the good sealing quality and the poor sealed portion 6X have different quantities of transmitted light. In the obtained binarized image data, each pixel corresponding to the sealed portion 6 of the good sealing quality has a luminance of "1 (bright)", and each pixel corresponding to the poor sealed portion 6X has a luminance of "0 (dark)".

The processing execution device 50 subsequently performs lump processing with regard to the set inspection object range as an object. The lump processing specifies a linkage component with regard to the pixels having the luminance of '1 (bright)" in the binarized image data (i.e., pixels corresponding to the sealed portion 6 of the good sealing quality) and calculates the area (the number of pixels according to one or more embodiments) of the specified linkage component (lump portion). The processing execution device 50 then determines whether a location having the good sealing quality in the sealed portion 6 has a sufficient area, based on the area of the lump portion and the area reference value stored in the quality judgment memory 53. According to one or more embodiments, the processing execution device 50 determines, when the areas of the respective lump portions are larger than the area reference value described above, that the respective sealed portions 6 have good quality of sealing and makes a non-defective determination, while otherwise determining that at least one sealed portion 6 has a poor quality of sealing and makes a defective determination.

The good/poor quality judgment technique may be appropriately changed according to various conditions. For example, one applicable judgment technique may make a non-defective determination when the number of the sealed portions 6 having good sealing quality is equal to or larger than a reference value set in advance and may otherwise make a defective determination. A determination process based on the shape of the linkage component may be performed, in addition to or in place of the determination process based on the area.

Figure 8:
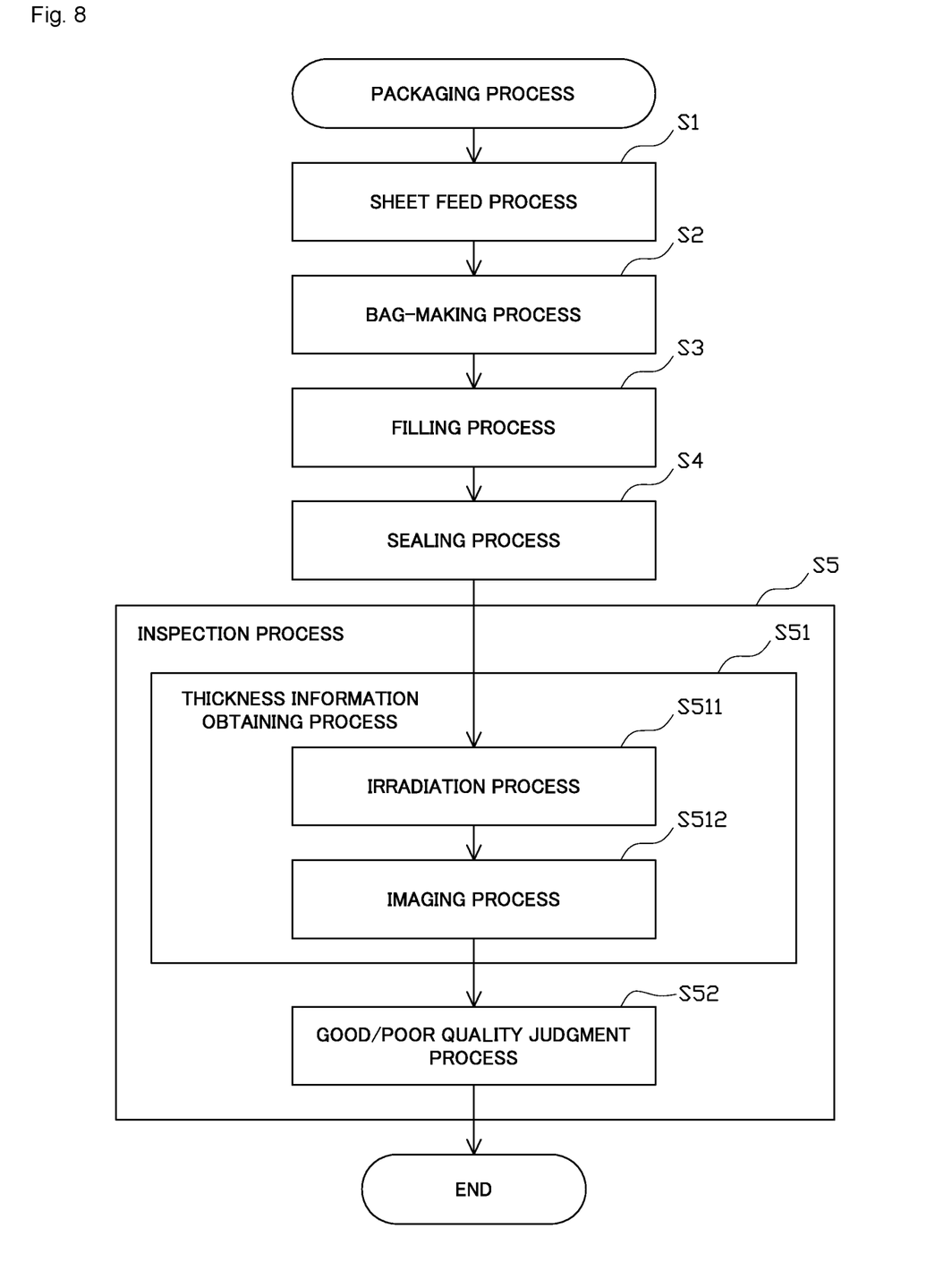
FIG. 8 is a flowchart showing a packaging process.

The following describes a packaging process (packaging method) including a sealing process of the seat 3 and an inspection process of the sealed portions 6 with reference to a flowchart of FIG. 8.

In a sheet feed process at step S1, the sheet feed mechanism 21 forms the sheet 3 in a belt-like shape with gussets formed on the respective ends in the width direction and feeds the sheet 3 formed in the belt-like shape to the bag-making mechanism 22.

In a subsequent bag-making process at step S2, the bag-making mechanism 22 thermally welds an end of the sheet 3 in the belt-like shape fed by the sheet feed mechanism 21 to form the welded part 5 and cuts the sheet 3 by a predetermined length to form the sheet 3 in a bag-like shape. When a sealed portion 6 of the welded part 5 is normally formed, the thickness of the sealed portion 6 becomes sufficiently smaller than the total thickness of the overlapping parts of the sheet 3 prior to thermal welding corresponding to the sealed portion 6. In a subsequent filling process at step S3, the filling mechanism 23 places a predetermined number of works 8 into the sheet 3 in the bag-like shape.

In a subsequent sealing process at step S4, the sealing mechanism 24 gusset-folds the opening of the sheet 3 in the bag-like shape with the works placed therein and thermally welds the gusset-folded opening of the sheet 3 to form the welded part 4. When a sealed portion 6 of the welded part 4 is normally formed, the thickness of the sealed portion 6 becomes sufficiently smaller than the total thickness of the overlapping parts of the sheet 3 prior to thermal welding corresponding to the sealed portion 6. After the sealing process S4, the packaging process cuts out a non-required part of the sheet 3 and forms the finger catchers 7, so as to obtain the package 1. According to one or more embodiments, the bag-making process S2 and the sealing process S4 correspond to the sealing process.

An inspection process at step S5 is subsequently performed for the obtained package 1 as an object. The inspection process S5 includes a thickness information obtaining process at step S51 and a good/poor quality judgment process at step S52.

The thickness information obtaining process at step S51 performs an irradiation process at step S511 and an imaging process at step S512. More specifically, the thickness information obtaining process causes the sheet 3 of the package 1 including the sealed portions 6 to be irradiated with the diffused ultraviolet light emitted from the illumination device 41 and causes the image of the ultraviolet light transmitted through the sheet 3 to be taken by the imaging device 42. The thickness information obtaining process accordingly obtains image data including information with regard to the quantities of transmitted light of the sealed portions 6 (luminance values of the sealed portions 6) as thickness information. According to one or more embodiments, image data with regard to the welded part 4 and image data with regard to the welded part 5 are respectively obtained as the image data.

The subsequent good/poor quality judgment process at step S52 performs good/poor quality judgment of the sealed portions 6, based on the obtained image data. The packaging process is then terminated. The good/poor quality judgment process respectively performs an inspection for the respective sealed portions 6 of the welded parts 4 and 5.

As described above in detail, according to one or more embodiments, the thickness information obtaining module 40 obtains the thickness information corresponding to the thickness of each sealed portion 6, and the processing execution device 50 determines the good/poor quality of sealing, based on the thickness information. As described above, the bag-making mechanism 22 and the sealing mechanism 24 perform thermal welding such as to correlate the good/poor quality of sealing to the thickness of each sealed portion 6. The configuration of performing the good/poor quality judgment based on the thickness information thus enables the good/poor quality of sealing to be determined with the higher accuracy.

Moreover, the thickness information obtained is the information with regard to the quantities of transmitted light of the sealed portions 6 based on the image data obtained by the imaging device 42. When the sheet 3 is irradiated with ultraviolet light, a logarithmic value of an ultraviolet light transmittance is generally proportional to the thickness of the sheet 3, and the ultraviolet light transmittance is inversely proportional to some power of the thickness of the sheet 3. Accordingly, the magnitude relation of the light quantity of ultraviolet light transmitted through the sheet 3 (quantity of transmitted light) depends upon the thickness of the sheet 3. The configuration of obtaining the information with regard to the quantities of transmitted light as the thickness information enables the thickness of the sheet 3 to be figured out more accurately. This enables the good/poor quality of sealing to be determined with the higher accuracy.

Furthermore, the configuration of one or more embodiments uses the image data to figure out the thickness of the entire area of each sealed portion 6. This configuration accordingly enables a sealing failure occurring in only a narrow part of the sealed portion 6 to be found out and further enhances the accuracy of inspection.

The present disclosure is not limited to the description of the above embodiments but may be implemented, for example, by configurations described below. The present disclosure may also be naturally implemented by applications and modifications other than those illustrated below.

(a) The above embodiments are configured to obtain the information with regard to the quantity of transmitted light of each sealed portion 6 as the thickness information. A modification may be configured to obtain the thickness of each sealed portion 6 as the thickness information. The thickness of each sealed portion 6 may be measured by clamping the sealed portion 6 or may be measured by using ultrasonic waves or the like.

(b) According to the embodiments described above, the bag-making mechanism 22 and the sealing mechanism 24 are configured to make the thickness of a sealed portion 6 smaller than the total thickness of the overlapping parts of the sheet 3 as an object to be thermally welded prior to thermal welding. According to a modification, the bag-making mechanism 22 and the sealing mechanism 24 may, however, be configured to perform thermal welding such as to make the thickness of a sealed portion 6 smaller than the total thickness and larger than a predetermined limit thickness. In this modification, the processing execution device 50 may be configured to process image data by a binarization process using a second luminance threshold value that is a larger value than the luminance threshold value described above and to determine whether there is any excessively thin sealed portion 6, based on the obtained binarized image data. This configuration allows for detection of a sealing failure or the like due to, for example, a damage of the sealed portion 6 and thereby further enhances the accuracy of inspection.

(c) According to the embodiments described above, the work 8 is a roll of paper. The work is, however, not limited to these embodiments. For example, the work may be any of various articles, such as a food item, a machine component or an electronic component. The work may be a semisolid or a liquid or may be in a powdery form.

(d) The shape, the area, the number and the positions of the sealed portions and the positional relationship of the sealed portions are not specifically limited in the package. For example, the sealed portions may be formed to be arranged continuously in a curved shape. The sealed portion may be used to seal the work in the packing bag.

(e) According to the embodiments described above, polyethylene is used as the constituent material of the sheet 3. The sheet 3 may, however, be made of a thermoplastic resin other than polyethylene.

(f) The above embodiments are configured to perform the inspection for the good/poor quality of sealing with regard to the sealed portions 6 after the works 8 are placed in the sheet 3 in the bag-like shape. A modification may be configured to perform the inspection for the good/poor quality of sealing with regard to the sealed portions 6 before the works 8 are placed in the sheet 3 in the bag-like shape.

According to the embodiments described above, the respective sealed portions 6 of the welded parts 4 and 5 are specified as the object of inspection. According to a modification, the respective sealed portions 6 of only one of the welded parts 4 and 5 may be specified as the object of inspection.

(g) The above embodiments use the sheet 3 formed in advance in the cylindrical shape. A modification may use one sheet in a non-cylindrical shape and perform so-called pillow packaging accompanied with center sealing.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

3 . . . sheet, 6 . . . sealed portion, 8 . . . work, 10 . . . packaging device (manufacturing device of package), 22 . . . bag-making mechanism (sealing unit), 24 . . . sealing mechanism (sealing unit), 30 . . . inspection device (inspection unit), 40 . . . thickness information obtaining module (thickness information obtaining unit), 41 . . . illumination device (irradiation unit), 42 . . . imaging device (imaging unit), 50 . . . processing execution device (good/poor quality judgment unit)

What is claimed is:

1. A manufacturing device of a package including a sheet and a work wrapped with the sheet, the manufacturing device comprising:
    a bag making unit that is configured to thermally weld a lower end of the sheet formed in a cylindrical shape to form a lower welded part and a packing bag;
    a filling unit that is configured to fill the work in the packing bag;
    a sealing unit that is configured to thermally weld at least a part of overlapping parts of the sheet at an upper end of the packing bag to form an upper welded part including a sealed portion composed of seal lines; wherein
    the sheet is transparent or translucent and the sealing unit makes, by the thermal welding, a thickness of the sealed portion after the thermal welding smaller than a total thickness of the overlapping parts prior to the thermal welding, and
    an inspection device configured to inspect a sealing quality of the sealed portion thermally welded by the sealing unit, wherein the inspection device is configured to obtain thickness information on the sealed portion and determine the sealing quality of the sealed portion based on the thickness information; and
    the inspection device further comprises:
    an irradiation device that comprises a diffusion plate and is configured to irradiate the sheet with ultraviolet light via the diffusion plate, the ultraviolet light being diffused by the diffusion plate such that a difference of luminance between a good sealed portion and a poor sealed portion in the sealed portion becomes distinct; and
    an imaging device configured to take an image of the ultraviolet light transmitting through the sheet and obtain image data comprising a plurality of pixels in which a pixel of the good sealed portion has a higher luminance value equal to or greater than a threshold value and a pixel of the poor sealed portion has a lower luminance value smaller than the threshold value,
    the imaging device further configured to:
        process the obtained image data using the threshold value to obtain binarized image data that express luminance of the pixels of the good sealed portion by 1 (bright) and luminance of the pixels of the poor sealed portion by 0 (dark), and
        determine whether the sealing quality of the sealed portion is good based on the binarized image data.

2. The manufacturing device of the package according to claim 1, wherein the inspection device
    obtains the thickness information using a light quantity transmitted through the sealed portion.

3. The manufacturing device of the package according to claim 1, wherein the inspection device is further configured to specify a linkage component of pixels each having the luminance of 1 (bright), determine whether an area of the linkage component is greater than a predetermined area, and upon determining that the area is greater than the predetermined area, determine that the sealing quality of the sealed portion is good.

4. A manufacturing method of a package including a sheet and a predetermined work wrapped with the sheet, the manufacturing method comprising:
- using a bag making unit, thermally welding a lower end of the sheet formed in a cylindrical shape to form a lower welded part and a packing bag;
- using a filling unit, filling the work in the packing bag;
- using a sealing unit, thermally welding at least a part of overlapping parts of the sheet at an upper end of the packing bag to form an upper welded part including a sealed portion composed of seal lines;

wherein
the sheet is transparent or translucent and the thermally welding by the sealing unit makes a thickness of the sealed portion after the thermal welding smaller than a total thickness of the overlapping parts prior to the thermal welding,
using an inspection device, inspecting a sealing quality of the sealed portion thermally welded by the sealing unit, and obtaining thickness information on the sealed portion and determining the sealing quality based on the thickness information; and
the inspecting further comprises:
using an irradiation device, irradiating the sheet with ultraviolet light via a diffusion plate, the ultraviolet light being diffused by the diffusion plate such that a difference of luminance between a good sealed portion and a poor sealed portion in the sealed portion becomes distinct;
taking, using an imaging device, an image of the ultraviolet light transmitting through the sheet and obtaining image data comprising a plurality of pixels in which a pixel of the good sealed portion has a higher luminance value equal to or greater than a threshold value and a pixel of the poor sealed portion has a lower luminance value smaller than the threshold value,
processing the obtained image data using the threshold value to obtain binarized image data that express luminance of the pixels of the good sealed portion by 1 (bright) and luminance of the pixels of the poor sealed portion by 0 (dark), and
determining whether the sealing quality of the sealed portion is good based on the binarized image data.

5. The manufacturing method of the package according to claim 4, wherein the inspection device obtains the thickness information, using a light quantity transmitted through the sealed portion.

* * * * *